(12) United States Patent
Buchman et al.

(10) Patent No.: US 10,719,486 B1
(45) Date of Patent: Jul. 21, 2020

(54) DE-DUPLICATED FILE SHARE MOUNTING FOR GRANULAR LEVEL DATA RECOVERIES

(71) Applicant: EMC CORPORATION, Hopkinton, MA (US)

(72) Inventors: Matthew D. Buchman, Seattle, WA (US); Jerzy Gruszka, Lacey, WA (US); Prashant Shukla, Redmond, WA (US); Min-Chih L. Earl, Redmond, WA (US)

(73) Assignee: EMC CORPORATION, Hopkinton, MA (US)

( * ) Notice: Subject to any disclaimer, the term of this patent is extended or adjusted under 35 U.S.C. 154(b) by 301 days.

(21) Appl. No.: 13/826,549

(22) Filed: Mar. 14, 2013

(51) Int. Cl.
*G06F 16/21* (2019.01)
(52) U.S. Cl.
CPC .................. *G06F 16/21* (2019.01)
(58) Field of Classification Search
CPC ........... G06F 17/30067; G06F 11/1451; G06F 11/1453; G06F 16/21
USPC .................................................. 707/674, 675
See application file for complete search history.

(56) References Cited

U.S. PATENT DOCUMENTS

| | | | | |
|---|---|---|---|---|
| 8,315,983 | B1 * | 11/2012 | Sumant | G06F 11/1469 707/645 |
| 9,037,547 | B1 * | 5/2015 | Shivdeo | G06F 16/27 707/664 |
| 10,042,715 | B1 | 8/2018 | Auchmoody et al. | |
| 2002/0143855 | A1 | 10/2002 | Traversat et al. | |
| 2007/0011153 | A1 | 1/2007 | Pillai et al. | |
| 2009/0313447 | A1 * | 12/2009 | Nguyen | G06F 11/1451 711/162 |
| 2010/0070725 | A1 * | 3/2010 | Prahlad | G06F 11/1453 711/162 |
| 2011/0196842 | A1 * | 8/2011 | Timashev et al. | 707/679 |
| 2011/0307657 | A1 * | 12/2011 | Timashev et al. | 711/112 |
| 2012/0005688 | A1 | 1/2012 | Kesavan et al. | |
| 2012/0066148 | A1 | 3/2012 | Sagi et al. | |
| 2012/0079499 | A1 | 3/2012 | Gold et al. | |
| 2012/0284236 | A1 * | 11/2012 | Timashev | G06F 11/1469 707/674 |
| 2014/0188808 | A1 * | 7/2014 | Wolf et al. | 707/654 |
| 2014/0195848 | A1 * | 7/2014 | Teli et al. | 714/15 |
| 2014/0297776 | A1 | 10/2014 | Volvovski et al. | |

OTHER PUBLICATIONS

VMware, Data Recovery 1.0 Evaluator's Guide, retrieved from archive.org for Mar. 2, 2012.*
U.S. Appl. No. 13/863,268, filed Apr. 15, 2013, Auchmoody, et al.
U.S. Appl. No. 15/005,810, filed Jan. 25, 2016, Auchmoody, et al.
U.S. Appl. No. 15/005,817, filed Jan. 25, 2016, Auchmoody, et al.

(Continued)

*Primary Examiner* — Cam Y Truong
(74) *Attorney, Agent, or Firm* — Workman Nydegger

(57) ABSTRACT

Systems and methods for granularly recovering a backup are provided. An image of a backup is mounted as a file system such that the files can be granularly restored. Image-level recovery and file-level recovery can be achieved from the same backup. The backup may also be de-duplicated.

16 Claims, 4 Drawing Sheets

(56) References Cited

OTHER PUBLICATIONS

U.S. Appl. No. 13/863,268, dated Nov. 19, 2015, Non-Final Rejection.
U.S. Appl. No. 13/863,268, dated Mar. 30, 2016, Notice of Allowance.
Updated Examiner Google Search dated Mar. 8, 2016 in U.S. Appl. No. 13/863,268.
Examiner IEEE Search dated Mar. 8, 2016 in U.S. Appl. No. 13/863,268.
Examiner ACM Search dated Mar. 8, 2016 in U.S. Appl. No. 13/863,268.
U.S. Appl. No. 15/005,810, dated Sep. 14, 2018, Final Office Action.

* cited by examiner

DE-DUPLICATED FILE SHARE MOUNTING FOR GRANULAR LEVEL DATA RECOVERIES

BACKGROUND OF THE INVENTION

1. The Field of the Invention

Embodiments of the present invention relate to backing up and restoring data. More particularly, embodiments of the invention relate to systems and methods for backing up data such that the data is de-duplicated and/or granularly restoring data in a virtualized environment.

2. The Relevant Technology

The processes of backing up data and of restoring data are complex and complicated for several reasons. For example, some of the data may be virtualized. Backing up virtualized data or virtual hard disks may require the entire virtual machine to be backed up. Further, data is constantly being changed due, for example, to use of the data and there is a need to generate backups that are as current as possible to the ever changing data.

In addition to the desirability of being able to recover data without any data loss, it is beneficial to restore data as the data appeared at some previous time. This means that the backup system should maintain the backups in a manner that permits older versions of the data to be restored and accessed.

Another issue facing backup and restore operations is that when it comes time to restore data, a user may only need to restore a sub-set of the data that is included in the backup. Unfortunately, the ability to restore the files or data that are actually needed may incur the cost of restoring an entire backup.

The ability to quickly restore data or to quickly restore a sub-set of the data is complicated by the fact that the restored data is often read-only. Because restore processes may need to establish a transactionally consistent state in the data or in the environment in which the data is restored, the inability to write can make restoring the data difficult.

Another issue associated with backups relates to the storage required to store the backups and the cost associated with the storage. The ability to store backups in a manner that enables the data to be restored at multiple restore points can consume significant data. Systems and methods are needed that enable backups to be efficiently stored while at the same time enabling the data to be granularly restored.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF THE PREFERRED EMBODIMENTS

Figure 1:
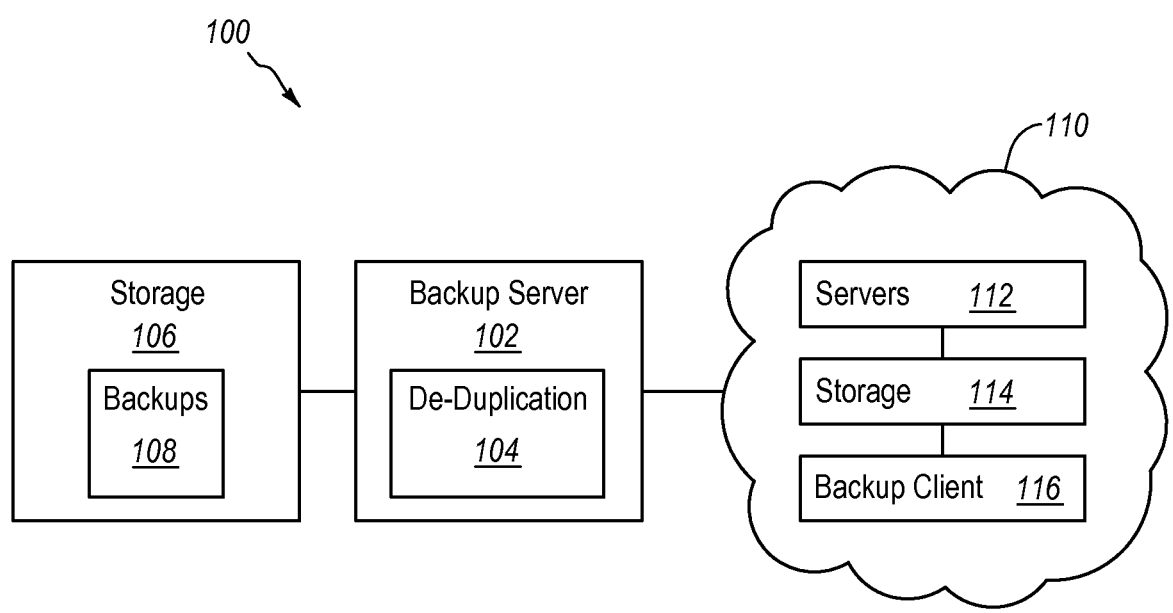
FIG. 1 illustrates a block diagram of a system capable of backing up data, de-duplicating the backup data and granularly restoring the data.

Embodiments of the invention relate to systems and methods for backing up and/or restoring data. Embodiments relate to restoring data by enabling read and write access to a mounted file system containing the restored data. The restoration of the data may include write operations, for example, to prepare the destination or environment of the restored data. The data may be sparsely mounted, however, and an environment for the data may be provided first. For example, a virtual hard disk may be mounted prior to mounting a sparse file system in which the data is restored. The virtual hard disk itself may be a sparse file. In addition to providing read and write access to the restored data and to the restored environment, the data retrieved by the backup and mounted in the file system has been de-duplicated.

Embodiments of the invention further provide a graphical user interface that enables individual files or individual pieces of data to be selected for restoration. A user is able to browse the backups and select specific files for restoration. When a specific file is selected, the backup client may automatically restore the environment (e.g., a virtual hard disk) and then restore the selected file in a file system mounted in the virtual hard disk. A virtual hard disk can be restored in a virtual machine or in a physical server.

Embodiments of the invention can eliminate redundancy by providing a single-pass backup that provides both image-level and file-level recovery. Conventional systems often include redundant backups of virtual machines: one backup to provide image level recovery that is performed within a parent partition and a second backup from within the virtual machine that will perform a file-level recovery. This redundancy is eliminated in embodiments of the invention.

Embodiments of the invention relate to de-duplicated file share mounting with granular level recovery of files. The data in the backup is de-duplicated (usually when the backup is performed or during post-processing of the backup). During the restore process, the restored data may be read/write without affecting the integrity of the backup from which the files are being restored.

In one example, when restoring data related to a virtual machine, an image-level backup may be exposed on a target or a destination (e.g., a physical server or a virtual machine on a node). This makes the virtual hard disk files for the virtual machine available on a file system local to the target. The virtual hard disks can be mounted and the file system volumes are then mounted on these virtual hard disks. Advantageously, the file system volumes allow browse and recovery of the files and folders from these file systems and allows the file systems to support read and write operations. Mounting the virtual hard disk from a backup may also include write operations to the restored virtual hard disk, which is an example of a restored file in addition to the data in the file system mounted on the virtual hard disk.

Advantageously, embodiments of the invention can enable file-level recovery from an image backup. This provides advantages compared to a full restoration of the data from the image backup or compared to redundant backups (both file-level and image-level backups).

Embodiments of the invention may generate backups of virtual machines, virtual hard disks, servers, data stores, or the like. Backups, which are also referred to herein as save sets, may include a plurality of files. For example, embodiments of the invention may also relate to restoring entire virtual machines, portions of a file, an entire file, virtual hard disks, or the like or any combination thereof. Consequently, the content of a backup or a save set may include other files or data in addition to virtual hard disk files. For example, the restoration of a particular file or set of files may require a virtual hard disk to be mounted or a virtual machine associated with the virtual hard disk to be instantiated.

FIG. 1 illustrates an example of a network or computer system that includes a backup system configured to backup data in the network and/or to restore the data or a portion of the data to the network or to a specific target or destination in the network. FIG. 1 illustrates a network 110, which may be a local area network, a wide area network, or the like. The network 110 may be accessible over various networks using various devices. Devices present in the network 110 can include at least servers 112 and storage 114, which may be examples of computing devices or of computer hardware. The storage 114 can be integral with the servers 112 or separate from the servers. A backup client 116 may also be instantiated in the network 110. The servers 112 may also support virtualization and may be examples of nodes or hosts that are configured to support one or more virtual machines. The destination of a restore operation may be one of the servers 112 (e.g., on the storage 114 associated with one of the servers 112) or a virtualized environment. The restored data may be a virtual file system mounted on a virtual hard disk, for example, and the file system may be mounted on the virtual hard disk.

The backup client 116, for example, may be instantiated on at least one of the servers 112, or on another device in the network 110. The backup client 116 may also be present on a server that supports virtualization. The backup client 116 can backup virtual machines and associated virtual hard disks in addition to other data. In one instance, the backup client 116 may be instantiated on, for example, a server that is configured to support virtual machines.

FIG. 1 further illustrates a backup server 102 that is associated with storage 106 (both of which may be part of the network 110). The storage 106 may be part of the storage 114 or may be separate from the storage 114. The storage 106 is configured to store backups of the applications/data/virtual machines in the network 110. The backups in the storage may be referred to as save sets or backups 108. The backups may have different formats and may be generated in different ways. In one example, the save sets or backups 108 include data images, partial backups, streaming backups, or the like.

Embodiments of the invention are capable of restoring specific files from the backups 108. In one example, the save sets or backups 108 include virtual hard disks. The virtual hard disks from the backups 108 can be exposed on one of the servers 112 (the destination server) as a virtual file system by the backup client 116. These virtual hard disks can be mounted from the virtual file system on the destination server and the file system can also be mounted on these virtual hard disks. By mounting the virtual hard disk to a virtual file system, for example, the virtual hard disk is writeable and is made to be transactionally consistent. As a result, the virtual file system allows writing to the virtual hard disk it contains.

In addition, mounting a virtual hard disk may also include mounting one or more snapshots or differencing virtual hard disks. The backup client 116 manages the mounting of the virtual hard disk and any associated differencing virtual hard disks such that the differences in the differencing virtual hard disks are applied in the appropriate order. For example, if the virtual hard disk is associated with two differencing virtual hard disks, the backup client applies the two differencing virtual hard disks in a particular order. The backup client 116 may cooperate with the hypervisor 210 and/or the VMM 216 when applying the differencing virtual hard disks.

By mounting the file systems on the virtual hard disks (which are examples of restored files), the files and directories can be browsed by a user and a single backup can be used for both image level recovery and file level recovery. Embodiments of the invention further enable the virtual hard disk to be both readable and writeable. The virtual hard disk may be writeable in order to mount the virtual hard disk in the virtual file system. A user can select specific files in the file system mounted in the restored virtual hard disk for recovery.

The servers 112 may include computing devices configured to operate as servers or that run applications including network-based applications. The servers 112 may include email servers, database servers, file servers, or the like. The servers 112 may also provide virtualization services and manage the operation of virtual machines. Some of the applications/servers may be operating on virtual machines. Some of the servers 112 may be used to establish virtual machines that may be used during the restoration of specific data. For example, a virtual hard disk included in the backups 108 may be mounted on a virtual file system on a server that is configured to support virtualization.

The storage 114 may be integrated with the servers 112 or may be separate from the servers 112. The storage 114 can include various types of storage configurations such as storage area networks (SANs), network-attached storage (NAS) and direct-attached storage (DAS), disk arrays, or the like. The storage can be abstracted to virtual machines.

The backup and/or restoration of data is conducted, in one example, by the backup client 116. The backup client 116 may coordinate with the backup server 102 to backup or restore data or access the storage 106 directly. In one example, the backup client 116 may interface with the backup server 102 or the storage 106 such that the backups 108 can be browsed to identify a particular virtual hard disk to mount. A user interface associated with the backup client 116 may enable the backups 108 to be browsed prior to granularly restoring the data in the backups 108. Granularly restoring data, in one example, refers to the ability to restore sub-sets of data without having to restore an entire save set or an entire backup.

During the backup process, the backup server 102 may also de-duplicate the data using a de-duplication application 104, which may alternatively be implemented on another server or which may be integrated with the backup client 116. The de-duplication module 104 is configured to de-duplicate the data that is included in the backups 108. The de-duplication application 104 may reduce redundant data in the storage capacity of the storage 106 or more specifically in the backups 108. The de-duplication application 104 identifies redundant data and replaces, in one example, some of the copies of the redundant data with a reference/pointer to a copy of the data that is stored elsewhere in the storage 106. In other systems, the de-duplication may use hash values and file offsets. Hash values can be used to identify unique blocks of data and file offsets may identify the location of the unique blocks of data in the backups 108.

For instance, the servers or the virtual machines in the network 110 may implement identical operating systems ("OSes") that include many identical files, executables, or other blocks of data. Some of the data used in the various virtual machines may also be identical. In this case, the de-duplication application 104 identifies the identical blocks of data, eliminates redundant copies from the storage 106, and stores pointers (or offset values) at the former locations of the redundant copies pointing to a single remaining instance of the data.

The de-duplication application 104 is provided in the computer environment 100 and may have access to the storage 106. The de-duplication application 104 processes data stored in storage 106 to identify and reduce redundant data. The data can be de-duplicated prior to being stored in the backups 108, while being stored in the backups 108, or after being stored in the backups 108. The de-duplication application 104 can be any de-duplication application configured to identify redundant data and replace the redundant data with one or more offsets, or pointers or references pointing to a single instance of the data.

For instance, in one embodiment of the invention the de-duplication application 104 de-duplicates data in-line. In other words, the de-duplication application 104 identifies and replaces redundant data with pointers as the data is ingested/written into the storage 106. According to another embodiment of the invention, the de-duplication application 104 de-duplicates data post-process. That is, the de-duplication application identifies and replaces redundant data with pointers after the data has already been ingested/written into the storage 106. Additionally, the de-duplication application 104 can de-duplicate data using a fixed block size or a variable block size or both.

The de-duplication application 104 can de-duplicate data in all or only a portion of the aggregate storage capacity of the storage 106. For instance, a portion of the aggregated storage can be allocated as a backup storage target. Alternately, it may be desirable to present a representation of all of the shared storage capacity to the de-duplication application 116 in order to globally de-duplicate data stored in the aggregate storage capacity. Advantageously, embodiments of the invention enable more efficient utilization of storage capacity due to the de-duplication of redundant data.

In addition to restoring files associated with a single virtual hard disk, embodiments of the invention contemplate restoring files from multiple virtual hard disks. In one example, a particular backup may include more than one virtual hard disk and a user may be able to select one or more of the virtual hard disks during a restore operation.

Figure 2:
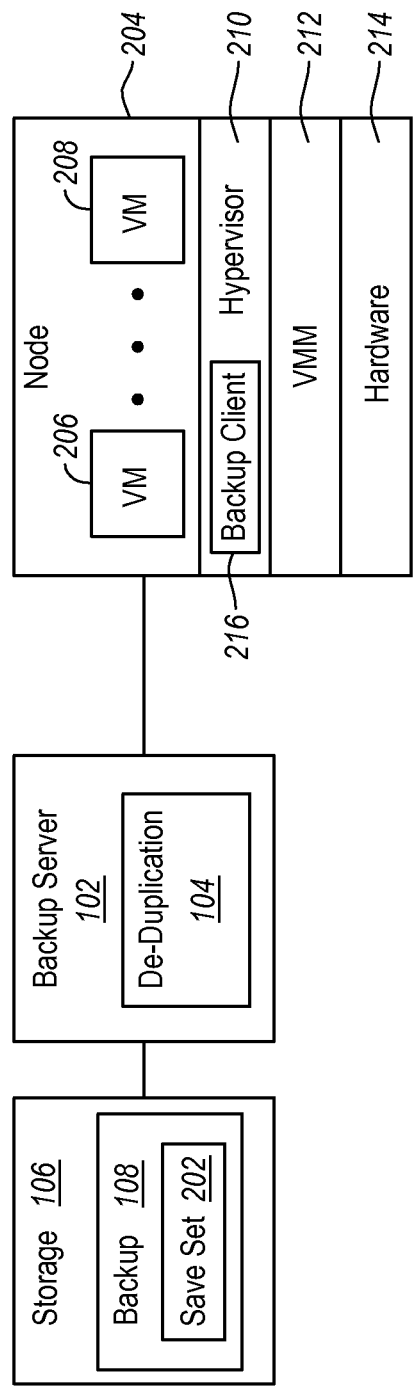
FIG. 2 illustrates a block diagram showing a backup server and a backup client that coordinate to backup and restore data.

FIG. 2 illustrates a block diagram illustrating the backup of a virtual machine. FIG. 2 illustrates a node 204, which may be an example of the servers 112 and may be a computing device. The node 204 is configured to support virtual machines. FIG. 2 illustrates that the node 204 supports the virtual machines 206 and 208.

The node 204 includes hardware 214 (e.g., a processor, RAM, network adapter, memory, etc.). A virtual machine manager (VMM) 212 and a hypervisor 210 are installed on or are operating on the node 204. The hypervisor 210 and the VMM 212 are typically software that cooperate to create and manage the virtual machines 208 and 210 on the hardware 214 of the node 204. The hypervisor 210 operates to abstract the hardware 214 in order to instantiate virtual machines.

FIG. 2 further illustrates a backup client 216 that operates in the hypervisor 210 in this example. The backup client 216 cooperates with the backup server 102 to backup and/or restore the virtual machines on the node 204. Alternatively, the backup client 216 may interact directly with the storage 106 when backing up a virtual machine.

For example, the backup client 216 may generate a backup of the virtual machine 206 that is ultimately stored as a save set 202 in the backups 108 on the storage 106. The save set 202 may be an image of the virtual machine and may include one or more virtual hard disks and may also include one or more differencing virtual hard disks. Embodiments of the invention enable the save set 202 to be browsed such that specific files can be restored. Once a specific save set or backup is selected, the content of the selected backup can be browsed. Advantageously, a file level restore can be performed from a single backup even if the backup is an image level backup.

The de-duplication application 104 operates to de-duplicate the save set 202 either inline or after the backup 202 is generated. During a restore operation, the backup server 102 can return requested data using any placeholders or offsets or pointers that may be present in the data that has been selected for restore. The process of locating and returning the requested data, regardless of where the data resides in the backups 108, can be performed transparently with respect to the target or destination of the restore process. The backup client 216 can cooperate with the backup server 102 to ensure that the requested data is found and returned.

When restoring the virtual hard disk, snapshots or differencing virtual hard disks that are related to the selected virtual hard disk may also be exposed or mounted. The VMM 212, by way of example, may also be responsible for exposing the snapshots or differencing virtual hard disks that may be related to the virtual hard disk that has been selected for a restore operation. When mounting the virtual hard disk (or virtual hard disks), differencing virtual hard disks or snapshots may be mounted as well by the backup application 216 for example. In restoring the virtual hard disk to the appropriate point in time, the snapshots or differencing virtual hard disks may be applied to the virtual hard disk. The backup client 216 applies the snapshots in an appropriate order.

Figure 3:
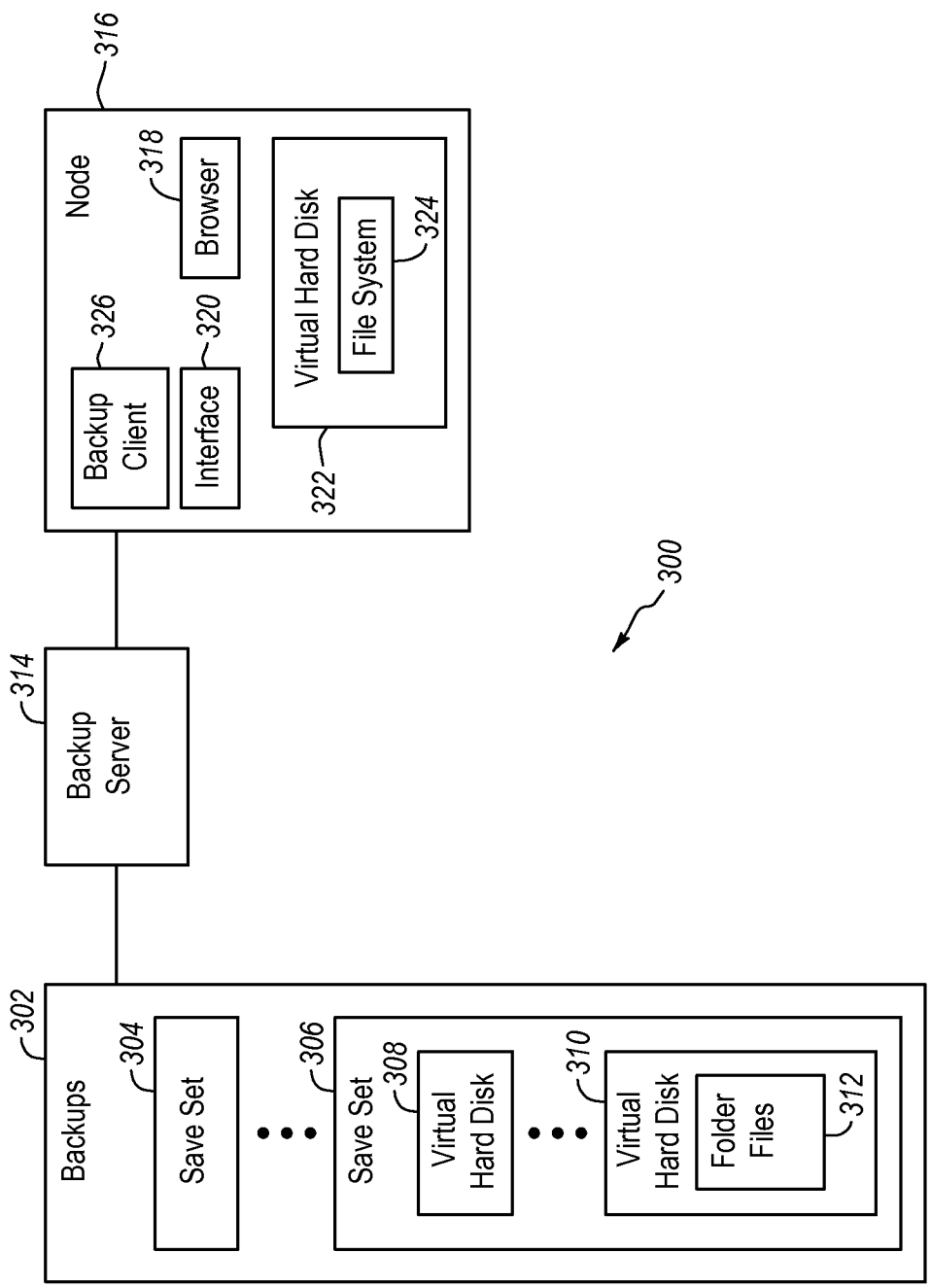
FIG. 3 illustrates a block diagram showing a backup server and a backup client that coordinate to granularly restore data.

FIG. 3 illustrates an example of restoring certain files or certain data. FIG. 3 illustrates a backup client 326 operating on a node 316, which is an example of a computing device and is an example of the node 204. The backup client 326 can present a user interface (e.g., a browser 318) that enables a user to interact with the backup client 326. An interface 320 may be provided, which may be part of the backup client 326, that enables the backup client 326 or the browser 318 to access the backup server 314 or to access and browse the backups 302 directly.

During a restore process, the backup client 326 browses the backups 302 to allow a user to select either a backup to be restored or to identify specific files to be restored. When browsing the backups 302, a user may be able to view multiple backups, illustrated as the save set 304 and the save set 306. A specific restore point for the data can be selected and the restore point typically corresponds to specific save sets or specific backups. In one example, the contents of the save sets 304 and 306 may be displayed in the browser 318 or by the backup client 326.

For example, the save set 306 may include a backup of multiple virtual hard disks, illustrated as virtual hard disks 308 and 310. The virtual hard disk 310, like other virtual hard disks, may be associated with a file set 312 that may be organized as folders and files. The virtual hard disks 308 and 310 may also be associated with differencing virtual hard disks or snapshots that may be implicitly selected during a restore process.

The backup client 326, in cooperation with the backup server 314 in one example, may enable a user to browse the save sets and select a virtual hard disk and/or specific files in the file set 312 for restoration. The data selected can be a file, a directory, a virtual hard disk, a database, or the like or any combination thereof. The restoration can be done granularly and the restoration of a file, or a portion of a file, or a group of files, or the like from a backup or a save set is an example of a granular restore.

After a backup (e.g., the virtual hard disk 310 or files therein) or save set is selected for restore, the selected virtual hard disk is mounted on the target (e.g., the node 316) that operates on the node 316 as the virtual hard disk 322. The virtual hard disk 322 may be in a virtual environment and can also be restored in a non-virtual environment in some examples. Any snapshots or differencing virtual hard disks associated with the virtual hard disk 310 may also be mounted and applied to the virtual hard disk 322. Mounting the virtual hard disk in a virtual file system is an example of exposing a virtual hard disk. The virtual hard disk 310 may be, by way of example only, a virtual machine or in a physical server. Advantageously, the restoration of the virtual hard disk 310 as the virtual hard disk 322 on the node 316 in this example is performed in a manner that enables both read and write access to the virtual hard disk 322. For example, restoring or mounting the virtual hard disk and/or mounting the file system on the restored virtual hard disk may require certain data to be written. The data that is written may be retrieved from the backup. The ability to write to the virtual hard disk 322 does not corrupt the backup of the virtual hard disk 310 in the save set 306. However, transactions (read/write operations) necessary to bring the virtual hard disk 322 to a transactionally consistent state may be performed. Bringing the virtual hard disk or a file system to a transactionally consistent state may include, by way of example only, applying logs or rolling back uncommitted transactions, or using differencing virtual hard disks. Bringing the virtual hard disk or a file system to a transactionally consistent state may also include establishing and mounting a differencing chain of differencing disks. The backup client 326 can then apply the chain of differencing disks as necessary during the restore operation.

The file system 324 may then be mounted on the virtual hard disk 322. If necessary, the file system 324 (e.g., the folders and files 312) can be implemented as a sparse volume since a small subset of the files in the file set 312 may only need to be restored. A user is then able to browse the file system 326 using the operating system of the virtual machine and one or more files can be selected for restore. The selected files are then restored without having to restore the entire save set 306.

In one example, a sparse file or a sparse volume is a file or volume that appears to be complete, but which is not actually complete. The sparse file or sparse volume may include placeholders for the actual data. The virtual hard disks can be mounted in a sparse manner and the file system can also be prepared in a sparse manner, although this is not required. A sparsely mounted file or file system can increase the speed with which the restore operation is performed.

When a file is selected in the file system 324 for restore, the backup client may access the file set 312 to retrieve the selected file. Because the save set 306 is de-duplicated, the file set 312 may include a pointer or an offset to the location of the file within the backups 302. The actual copy of the file may be in the selected save set 306 or in another save set. In one example, the de-duplication can be granularly applied. For example, all save sets may be globally de-duplicated. Alternatively, individual save sets may be de-duplicated separately from other save sets in the backups 302. For example, save sets associated with a particular virtual machine or server may be de-duplicated independently of save sets associated with other virtual machines, servers, or applications.

Figure 4:
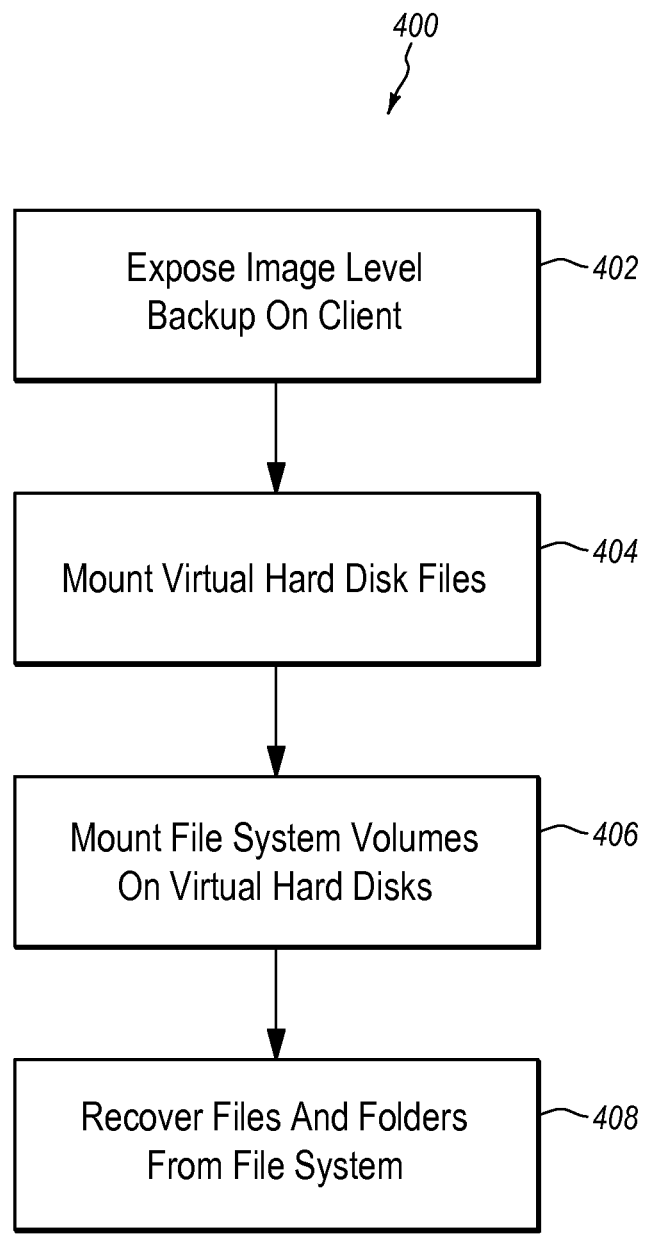
FIG. 4 illustrates a flow diagram of an example method for recovering de-duplicated data.

FIG. 4 illustrates an example method for granularly restoring data. A method 400 may begin by exposing an image level backup in block 402. The image level backup may be exposed by a backup client and may be presented via a user interface. In this example, exposing a backup or a save set includes making it possible for a user to browse the backups.

Once a specific file or a specific virtual hard disk is selected from the exposed image level backup, the virtual hard disk containing the selected files is mounted in a virtual machine in block 404. Mounting a virtual hard disk may include write operations such that a mount point can be established.

Next, a file system volume is mounted in the virtual hard disk in block 406. The file system volume may be a sparse volume. In addition, a user may be able to browse the file system that has been mounted on the virtual hard disk. From the mounted file system, specific files can be selected and restored. When a specific file is selected, the file may be retrieved by the backup client from the relevant save set as described herein and restored in block 408.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for granularly restoring data from a backup from a target client, the method comprising:
    generating an image level backup of a virtual machine from within a parent partition without generating a backup from within the virtual machine for file-level recovery, wherein the image level backup is read only and is stored on a storage device;
    exposing the image level backup by a backup client and presenting the image level backup in a user interface such that virtual hard disks included in the image level backup are browsable;
    selecting a virtual hard disk from the image level backup through the user interface, wherein the selected virtual hard disk contains pointers or offsets that are included in the image level backup for identifying locations of files;
    mounting the selected virtual hard disk in the virtual machine, wherein the mounting the selected virtual hard disk includes performing write operations to establish a mount point and bring the selected virtual hard disk to a transactionally consistent state, wherein the mounting the selected virtual hard disk further includes performing writes to combine one or more differencing virtual hard disks with the selected virtual hard disk;
    mounting a file system volume on the selected virtual hard disk, wherein the selected virtual hard disk is writable and deduplicated;
    browsing the files included in the selected virtual hard disk through the user interface;
    selecting specific files from the selected virtual hard disk to recover through the user interface;
    in response to the selection of the specific files in the selected virtual hard disk mounted on a target device, reading the selected specific files from the image level backup, wherein at least one selected image level backup of the selected specific files is-deduplicated;
    retrieving the selected specific files from the image level backup; and
    directly recovering the specific files from the selected virtual hard disk to the target client; and
    reading and writing to the selected virtual hard disk at the target client when recovering the specific files without affecting an integrity of the image level backup.

2. The method of claim 1, wherein exposing the image level backup includes providing the user interface and browsing backups including the image level backup through the user interface.

3. The method of claim 1, wherein exposing the image level backup includes accessing the image-level backup of a virtual machine.

4. The method of claim 1, wherein mounting the selected virtual hard disk includes writing data read from the image level backup to mount the selected virtual hard disk, wherein mounting the selected virtual hard disk further includes mounting and applying one or more differencing virtual hard disks to the selected virtual hard disk.

5. The method of claim 4, further comprising mounting a file system fully or sparsely.

6. The method of claim 1, wherein in response to a selection of a file in the selected virtual hard disk mounted on the target device, reading the selected file from the image level backup, wherein the selected image level backup is de-duplicated.

7. A method for granularly restoring files from a backup of the files from a target node, the method comprising:
    generating an image level backup of a virtual machine from within a parent partition without generating a backup from within the virtual machine for file-level recovery, wherein the image level backup is read only and is stored on a storage device;
    presenting a user interface to a user on a display associated with the target node, wherein the user interface is configured to receive input from the user;
    exposing the image level backup on the target node and displaying the image level backup on the user interface such that the image level backup is browsable, wherein the image level backup includes one or more virtual hard disks and each virtual hard disk includes one or more files;
    selecting a virtual hard disk from the image level backup displayed in the user interface, wherein the selected virtual hard disk contains a pointer or offset that is included in the image level backup for identifying a location of the file;
    mounting the selected virtual hard disk in a virtual machine, wherein the mounting the selected virtual hard disk includes performing write operations to establish a mount point to bring the selected virtual hard disk to a transactionally consistent state, wherein the mounting the selected virtual hard disk further includes performing writes to combine one or more differencing virtual hard disks with the elected virtual hard disk;
    mounting a local file system in the selected virtual hard disk on the target node;
    accessing the selected virtual hard disk using the local file system of the target node;
    browsing the selected virtual hard disk through the user interface;
    selecting specific files from the selected virtual hard disk to restore through the user interface;
    in response to the selection of the specific files in the selected virtual hard disk mounted on the target node, reading the selected specific files from the image level backup, wherein at least one selected image level backup of the selected specific files is de-duplicated;
    retrieving the selected specific files directly from the image level backup;
    and restoring the selected specific files retrieved from the image level backup to the target node.

8. The method of claim 7, wherein accessing an image level backup in response to the input includes exposing the image level backup for viewing, wherein mounting the selected virtual hard disk on a node includes mounting the selected virtual hard disk in a virtual file system.

9. The method of claim 7, wherein mounting the local file system includes sparsely mounting the local file system on the virtual machine or a physical server.

10. The method of claim 7, wherein mounting the selected virtual hard disk further includes mounting one or more differencing virtual hard disks associated with the selected virtual hard disk on the target node.

11. The method of claim 10, wherein restoring at least one file includes reading the at least one file from the image level backup and storing the at least one file on the selected virtual hard disk on the target node, wherein the selected virtual hard disk is a sparse file and the at least one file is a sparse file.

12. The method of claim 11, wherein the at least one file is de-duplicated and is stored in the selected virtual hard disk included in the image level backup, wherein a pointer or offset in the selected virtual hard disk included in the image level backup identifies a location of the at least one file.

13. The method of claim 7, wherein the selected virtual hard disk and the file system support read and write operations while being restored.

14. A non-transitory computer readable storage comprising computer readable instructions that when performed by a processor perform operations comprising:
   generating an image level backup of a virtual machine from within a parent partition without generating a backup from within the virtual machine for file-level recovery, wherein the image level backup is read only and is stored on a storage device;
   presenting a user interface to a user on a display associated with a target node, wherein the user interface is configured to receive input from the user;
   exposing the image level backup on the target node and displaying the image level backup on the user interface such that the image level backup is browsable, wherein the image level backup includes one or more virtual hard disks and each virtual hard disk includes one or more files;
   selecting a virtual hard disk from the image level backup displayed in the user interface, wherein the selected virtual hard disk contains a pointer or offset that is included in the image level backup for identifying a location of the file;
   mounting the selected virtual hard disk in a virtual machine, wherein the mounting the selected virtual hard disk includes performing write operations to establish a mount point to bring the selected virtual hard disk to a transactionally consistent state, wherein the mounting the selected virtual hard disk further includes performing writes to combine one or more differencing virtual hard disks with the selected virtual hard disk;
   mounting a local file system in the selected virtual hard disk on the target node;
   accessing the selected virtual hard disk using the local file system of the target node;
   browsing the selected virtual hard disk through the user interface;
   selecting specific files from the selected virtual hard disk to restore through the user interface;
   in response to the selection of the specific files in the selected virtual hard disk mounted on the target device, reading the selected specific files from the image level backup, wherein at least one selected image level backup of the selected specific files is de-duplicated;
   retrieving the selected specific files directly from the image level backup;
   and restoring the selected specific files retrieved from the image level backup to the target node.

15. The non-transitory computer readable storage of claim 14, the operations further comprising restoring the selected virtual hard disk to a transactionally consistent state on the target node and sparsely mounting the file system on the virtual hard disk at the target node.

16. The non-transitory computer readable storage of claim 14, wherein the selected virtual hard disk that has been established on the target node and the local file system that has been mounted on the selected virtual hard disk supports read and write operations, wherein write operations are performed to mount the local file system on the virtual hard disk at the target node, further comprising mounting multiple virtual hard disks on the target node from the image level backup and mounting the local file system on the multiple virtual hard disks.

* * * * *